(12) United States Patent  
Mitchell

(10) Patent No.: US 9,009,014 B2
(45) Date of Patent: Apr. 14, 2015

(54) SYSTEM, METHOD AND COMPUTER PROGRAM PRODUCT TO SIMULATE THE PROGRESSIVE FAILURE OF RUPTURE DISKS IN DOWNHOLE ENVIRONMENTS

(75) Inventor: Robert Franklin Mitchell, Houston, TX (US)

(73) Assignee: Landmark Graphics Corporation, Houston, TX (US)

(*) Notice: Subject to any disclaimer, the term of this patent is extended or adjusted under 35 U.S.C. 154(b) by 370 days.

(21) Appl. No.: 13/546,613

(22) Filed: Jul. 11, 2012

(65) Prior Publication Data

US 2014/0019102 A1    Jan. 16, 2014

(51) Int. Cl.
*G06G 7/48* (2006.01)
*E21B 43/12* (2006.01)
*E21B 21/08* (2006.01)

(52) U.S. Cl.
CPC ............. *E21B 43/12* (2013.01); *E21B 21/08* (2013.01)

(58) Field of Classification Search
CPC ......... E21B 34/10; E21B 29/06; E21B 33/12; E21B 19/00; E21B 34/06; E21B 29/00; E21B 23/06; E21B 33/13; E21B 47/06; E21B 43/04; E21B 43/00; E21B 17/10; G01V 1/00

USPC .............. 703/6, 10; 166/373, 376, 387, 90.1, 166/250.07, 372, 278; 367/14
See application file for complete search history.

(56) References Cited

U.S. PATENT DOCUMENTS

| 4,932,474 | A  | * | 6/1990  | Schroeder et al. ............ 166/278 |
| 5,819,853 | A  | * | 10/1998 | Patel ............................. 166/373 |
| 2004/0114463 | A1 | * | 6/2004  | Berg et al. ....................... 367/14 |
| 2007/0215358 | A1 | * | 9/2007  | Messick et al. ............... 166/372 |
| 2007/0246227 | A1 | * | 10/2007 | Ezell et al. .................... 166/387 |
| 2008/0156498 | A1 | * | 7/2008  | Phi et al. ....................... 166/376 |
| 2009/0229832 | A1 | * | 9/2009  | King ............................. 166/373 |
| 2009/0250226 | A1 | * | 10/2009 | Al-Anazi ....................... 166/376 |
| 2010/0108326 | A1 | * | 5/2010  | Messick et al. ............... 166/373 |
| 2011/0017448 | A1 | * | 1/2011  | Pipchuk et al. .......... 166/250.07 |
| 2011/0284209 | A1 | * | 11/2011 | Carpenter et al. ........... 166/90.1 |
| 2011/0315405 | A1 | * | 12/2011 | Solhaug et al. ............... 166/387 |

OTHER PUBLICATIONS

Osman, R.H., "Water hammer analysis of Pipeline system", Keu92, 1992.*

* cited by examiner

*Primary Examiner* — Kandasamy Thangavelu
(74) *Attorney, Agent, or Firm* — Haynes and Boone, LLP

(57) ABSTRACT

Systems and related methods to simulate, predict, and report progressive failures of rupture disks in response to thermal expansion of trapped annular fluids.

22 Claims, 4 Drawing Sheets

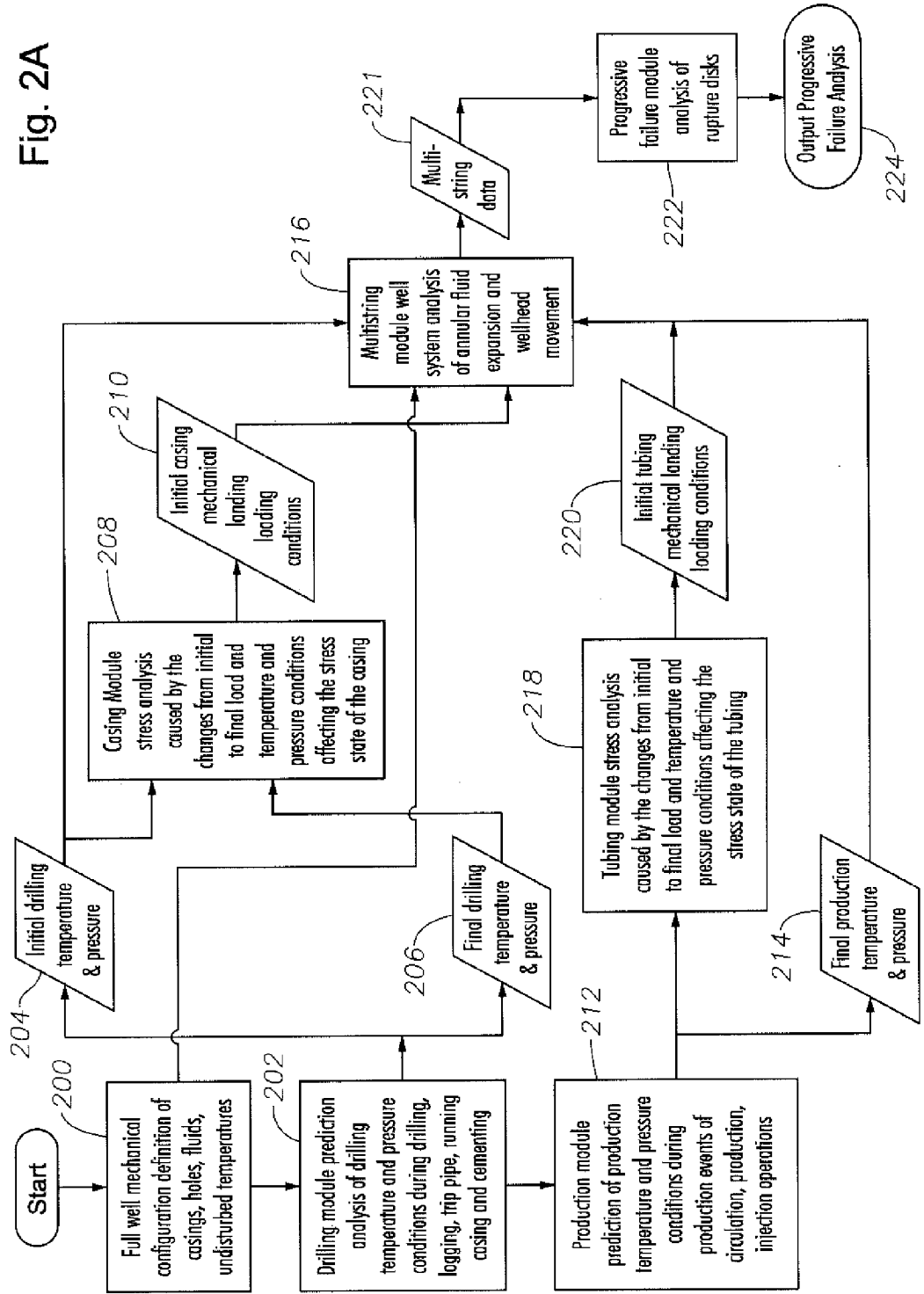

SYSTEM, METHOD AND COMPUTER PROGRAM PRODUCT TO SIMULATE THE PROGRESSIVE FAILURE OF RUPTURE DISKS IN DOWNHOLE ENVIRONMENTS

FIELD OF THE INVENTION

The present invention generally relates to downhole simulators and, more specifically, to a system to simulate and report progressive failures of rupture disks along a wellbore due to trapped annular pressure.

BACKGROUND

Traditionally, rupture disks have been utilized to combat annular pressure increases in downhole environments. Rupture disks mitigate the effects of increased annular pressure by failing at a specified pressure increment, thus allowing fluid flow between the annuli separated by the burst disc, which will then reduce the annulus pressure. This reduced pressure is intended to prevent damage to the well completion caused by the annulus pressure build up. If multiple rupture discs are used in the well completion design, there is the potential for progressive failures if the pressure redistribution caused by the failed rupture disk, in turn, causes additional failures of other rupture disks.

However, to date, the prior art has failed to produce a system to analyze, predict and report the progressive failures of rupture disks. Accordingly, there exists a need in the art for a systematic analysis that predicts and models progressive rupture disks failures, thereby providing the ability to reconfigure completion designs to avoid such failures.

BRIEF DESCRIPTION OF THE DRAWINGS

FIGS. 2A & 2B are flow charts illustrating data flow associated with an exemplary methodology of the present invention.

DESCRIPTION OF ILLUSTRATIVE EMBODIMENTS

Illustrative embodiments and related methodologies of the present invention are described below as they might be employed in a system to simulate and report progressive failures of rupture disks along a wellbore due to trapped annular pressure. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1:
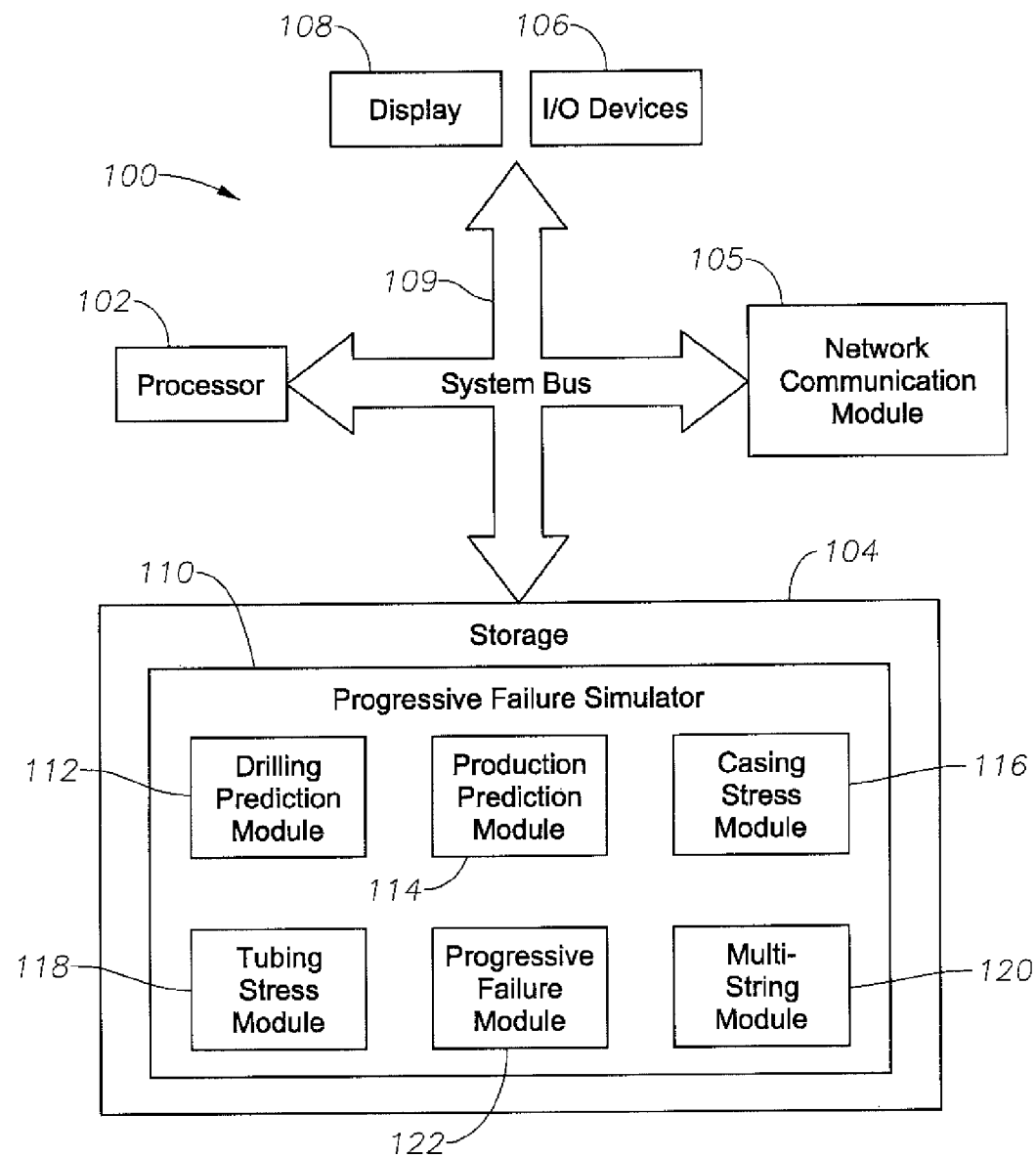
FIG. 1 illustrates a block diagram of a progressive failure analysis system according to an exemplary embodiment of the present invention.

FIG. 1 shows a block diagram of progressive failure analysis system 100 according to an exemplary embodiment of the present invention. In one embodiment, progressive failure analysis system 100 includes at least one processor 102, a non-transitory, computer-readable storage 104, transceiver/network communication module 105, optional I/O devices 106, and an optional display 108, all interconnected via a system bus 109. Software instructions executable by the processor 102 for implementing software instructions stored within progressive failure simulator 110 in accordance with the exemplary embodiments described herein, may be stored in storage 104 or some other computer-readable medium.

Although not explicitly shown in FIG. 1, it will be recognized that progressive failure analysis system 100 may be connected to one or more public and/or private networks via appropriate network connections. It will also be recognized that the software instructions comprising progressive failure simulator 110 may also be loaded into storage 104 from a CD-ROM or other appropriate storage media via wired or wireless means.

FIG. 1 further illustrates a block diagram of progressive failure simulator 110 according to an exemplary embodiment of the present invention. As will be described below, progressive failure simulator 110 comprises drilling prediction module 112, production prediction module 114, casing stress module 116, tubing stress module 118, multi-string module 120, and a progressive failure module 122. Based upon the input variables as described below, the algorithms of the various modules combine to formulate the progressive failure analysis of the present invention.

Drilling prediction module 112 simulates, or models, drilling events and the associated well characteristics such as the drilling temperature and pressure conditions present downhole during logging, trip pipe, easing, and cementing operations. Production prediction module 114 models production events and the associated well characteristics such as the production temperature and pressure conditions present downhole during circulation, production, and injection operations. Casing stress module 116 models the stresses caused by changes from the initial to final loads on the casing, as well as the temperature and pressure conditions affecting the casing.

Tubing stress module 118 simulates the stresses caused by changes from the initial to final loads on the tubing, as well as the temperature and pressure conditions affecting the tubing. The modeled data received from the foregoing modules is then fed into multi-string module 120 which analyzes and then models the annular fluid expansion and wellhead movement present in a system defined by the original input variables. Thereafter, the data modeled in multi-string module 120 is then fed into progressive failure module 122, which analyzes and reports the progressive failure of rupture disks in response to trapped annular pressure. Persons ordinarily skilled in the art having the benefit of this disclosure realize there are a variety modeling algorithms that could be employed to achieve the results of the foregoing modules.

Figure 2B:
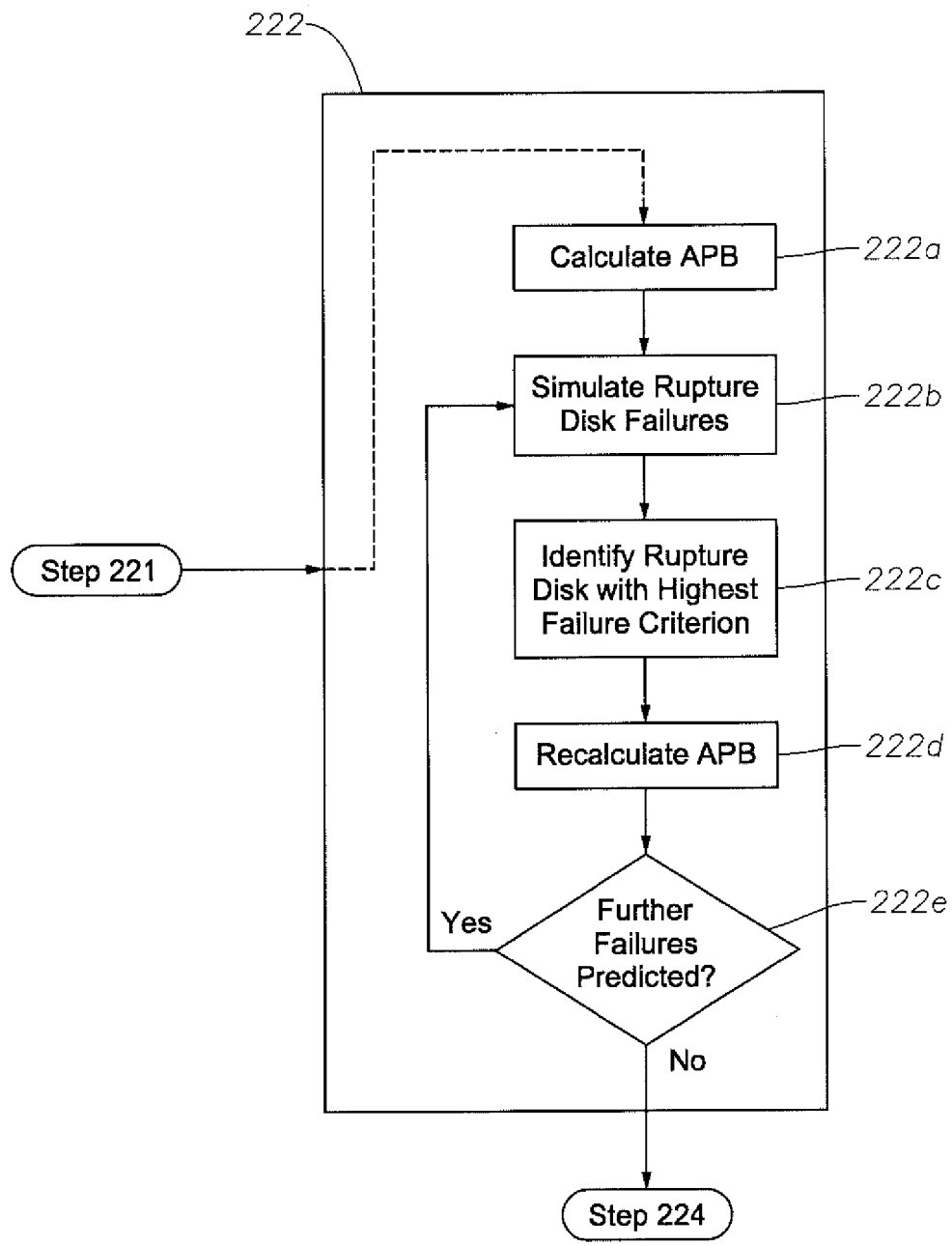

FIGS. 2A & 2B illustrate the data flow of progressive failure analysis system 100 according to an exemplary methodology of the present invention. At step 200, the mechanical configuration of the well is defined using manual or automated means. For example, a user may input the well variables via I/O device 106 and display 108. However, the variables may also be received via network communication module 105 or called from memory by processor 102. In this exemplary embodiment, the input variables define the well configuration such as, for example, number of strings, casing and hole dimensions, fluids behind each string, cement types, and undisturbed static downhole temperatures. As will be described below, this configuration data also includes data related to rupture disks utilized in the well completion. Based upon these input variables, at step 202, using drilling prediction module 112, processor 102 models the temperature and pressure conditions present during drilling, logging, trip pipe, casing, and cementing operations. At step 204, processor 102 then outputs the initial drilling temperature and pressure of the wellbore.

Further referring to FIG. 2A, at step 206, processor 102 outputs the "final" drilling temperature and pressure. Here, "final" can also refer to the current drilling temperature and pressure of the wellbore if the present invention is being utilized to analyze the wellbore in real time. If this is the case, the "final" temperature and pressure will be the current temperature and pressure of the wellbore during that particular stage of downhole operation sought to be simulated. Moreover, the present invention could be utilized to model a certain stage of the drilling or other operation. If so, the selected operational stage would dictate the "final" temperature and pressure.

The initial and final drilling temperature and pressure values are then fed into casing stress module 116, where processor 102 simulates the stresses on the casing strings caused by changes from the initial to final loads, as well as the temperature and pressure conditions affecting those casing strings, at step 208. At step 210, processor 102 then outputs the initial casing mechanical landing loading conditions to multi-string module 120 (step 216). Referring back to step 200, the inputted well configuration data may also be fed directly to multi-string module 120 (step 216). In addition, back at step 204, the initial drilling temperature and pressure data can be fed directly into multi-string module 120 (step 216).

Still referring to the exemplary methodology of FIG. 2A, back at step 202, processor 102 has modeled the drilling temperature and pressure conditions present during drilling, logging, trip pipe, casing, and cementing operations. Thereafter, at step 212, these variables are fed into production prediction module 114, where processor 102 simulates production temperature and pressure conditions during operations such as circulation, production, and injection operations. At step 214, processor determines the final production temperature and pressure based upon the analysis at step 212, and this data is then fed into multi-string module 120 at step 216.

Referring back to step 212, after the production temperature and pressure conditions have been modeled, the data is fed into tubing stress module 118 at step 226. Here, processor 102 simulates the tubing stresses caused by changes from the initial to final loads, as well as the temperature and pressure conditions affecting the stress state of the tubing. Thereafter, at step 220, processor 102 outputs the initial tubing mechanical landing loading conditions, and this data is fed into multi-string module 120 (step 216). At step 216, now that all necessary data has been fed into multi-string module 120, the final (or most current) well system analysis and simulation is performed by processor 102 in order to determine the annular fluid expansion (i.e., trapped annular pressures) and wellhead movement.

Thereafter, at step 222, processor 102 performs a progressive failure analysis of the wellbore (using progressive failure module 122) as defined by the data received from multi-string module 120. Here, taking into account defined rupture disk data, progressive failure module 122 will analyze and simulate the annular fluid expansion (i.e., trapped annular pressure), and any associated rupture disk failures, over the life of the defined wellbore. Accordingly, the exemplary methodology illustrated in FIGS. 2A & 2B are used to simulate and report progressive rupture disk failures, even in real-time through linkage of final thermal operating conditions to the desired downhole event.

The logic flow of progressive failure module 122 will now be briefly summarized, as would be readily understood by persons ordinarily skilled in the art having the benefit of this disclosure. In general, the present invention achieves this by determining a set of annuli pressures that equalize the fluid volume change in a given annuls to the annulus volume change due to well deformation. While the change in fluid volume depends only on the fluid pressure, the annulus volume is influenced by all the pressures changes in all of the annuli. As a result, change of pressure in a given annulus affects pressures in all other annuli.

As a result of this interaction, in a multiple rupture disc system, the failure of one disc will alter the annulus pressures, which may result in further disc failures. Thus, the proper analysis is progressive, i.e. the failure of one disc alters the annulus pressure, possibly resulting in the failure of a second rupture disc. Processor 102, via progressive failure module 122, continues this process until either all discs have failed or no further disc failure is predicted. Moreover, other types of failures, such a formation fracturing, are also analyzed as part of the overall analysis.

As would be understood by one ordinarily skilled in the art having the benefit of this disclosure, the failure of a rupture disc implies two effects. First, the pressures in the two annuli connected by the burst disc are equilibrated. Second, fluid may flow from one annulus to the other. The second effect does not need to be explicitly calculated because the new equilibrium pressure criterion is that the sum of the fluid volume changes for the two annuli must equal the change in volume of the two annuli. By summing the two effects, the flow between annuli is canceled out of the equations.

Now, referring to FIGS. 2A & 2B, an exemplary methodology of the logic flow of progressive failure module 122 will now be described. At step 221, multi-string module 120 outputs the multi-string data that includes the final (or most current) well system data, including the annular fluid expansion and wellhead movement data. At step 222a, processor 102 determines the annular pressure buildup ("APB") of all annuli of the well completion.

At step 222b, processor 102 then analyzes all defined rupture disks, simulates failure scenarios, and determines a list of possible rupture disk failures that may occur over the life of the well. To summarize the logic utilized by processor 102 to achieve this, for internal pressure Pi>external pressure Po, rupture disc failure is defined when Pi>Po+Pr, where Pr is the rupture disc pressure. Similarly, if Po>Pi, rupture disc failure is defined when Po>Pi+Pr. Applying this logic, processor 102 computes a list of rupture disk failures.

At step 222c, processor 102 then assigns failure criterion to each rupture disk based upon the analysis of step 222b. Assuming rupture disk failure is predicted, the failure criterion applied by processor 102 is |Po−Pi|/Pr. Thereafter, processor 102 identifies the rupture disk having the highest failure criterion (i.e., the highest probability of failure).

At step 222d, processor 102 recalculates the APB. However, in this calculation, processor 102 assumes the identified rupture disk (having the highest failure criterion) has actually ruptured and, thus, performs the calculation with the annuli connected by the failed rupture disk. At step 222e, processor 102 then performs another simulation of the well to determine whether any further rupture disk failures are predicted. If the determination is "yes", the algorithm loops back to step 222b, and processor 102 performs the analysis again, with the assumption that the previously identified failed rupture disk has failed. If the answer is "no" at step 222e, processor outputs the report at step 224. In this exemplary embodiment, the report, which may be provided in textual or graphical format, lists the rupture discs in the order of failure and the resulting final annulus pressures.

Figure 3:
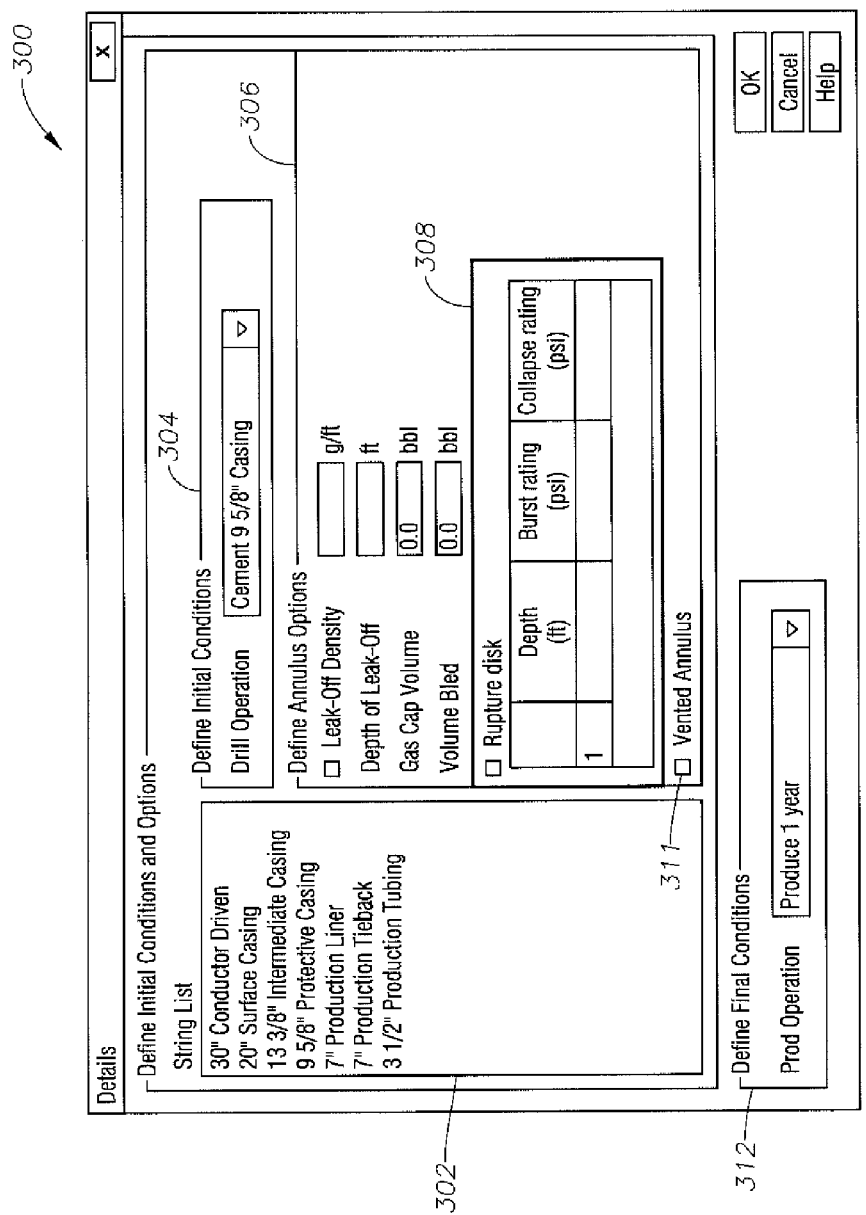
FIG. 3 is a screen shot of an interface having various wellbore configuration windows according to an exemplary embodiment of the present invention.

FIG. 3 illustrates a user interface 300 utilized to defined wellbore and rupture disk characteristics according to an exemplary embodiment of the present invention. At step 200, user interface 300 is displayed on display 108. In window 302, a list of user-specified string characteristics are displayed. Windows 304 and 306 are used to define initial conditions and annulus options, respectively. In window 308, the well configuration is defined to include any number of rupture disks per string and their respective depths, burst ratings, and collapse ratings. A vented or unvented annulus 311 may also be defined. Lastly, window 312 allows definition of the final conditions such as, for example, a production operation and a corresponding time period. After the well configuration has been defined via interface 300, progressive failure analysis system 100 simulates the effects that one or more failed rupture disks would have on the APB over the specified life of the well.

As described above, the present invention allows definition of wellbore and rupture disk and analysis of progressive failures that may occur over the life of the well. Although not described herein, other mitigation techniques, such as the use of syntactic foam, may be modeled using the present invention, as would be understood by persons ordinarily skilled in the art having the benefit of this disclosure. In this instance, the present invention would perform the progressive failure analysis described herein while taking into account the other defined mitigation data.

Accordingly, exemplary embodiments of the present invention may be utilized to conduct a total well system analysis during the design phase or in real-time. It can also be used to analyze the influence that progressive failure of rupture disks would have on the thermal expansion of annulus fluids, and/or the influence of loads imparted on the wellhead during the life of the well, as well as the load effects on the integrity of a well's tubulars. Accordingly, the load pressures and associated wellhead displacement values are used to determine the integrity of a defined set of tubulars and rupture disks in the completed well or during drilling operations.

Although various embodiments and methodologies have been shown and described, the invention is not limited to such embodiments and methodologies and will be understood to include all modifications and variations as would be apparent to one skilled in the art. For example, the present invention may also determine alternative well completion designs in the event that rupture disk failures are determined. Therefore, it should be understood that the invention is not intended to be limited to the particular forms disclosed. Rather, the intention is to cover all modifications, equivalents and alternatives falling within the spirit and scope of the invention as defined by the appended claims.

I claim:

1. A computer-implemented method to determine an occurrence of progressive failures of rupture disks along a wellbore, the method comprising:
   (a) analyzing, using a computer, a configuration of the wellbore;
   (b) determining, using the computer, an annular pressure buildup of the wellbore based upon the configuration of the wellbore;
   (c) determining, using the computer, whether progressive failure of the rupture disks will occur along the wellbore; and
   (d) outputting a report reflecting the determination of step (c).

2. A computer-implemented method as defined in claim 1, wherein step (c) further comprises:
   simulating a failure of one or more rupture disks;
   identifying the rupture disk having a highest probability of failure; and
   re-simulating a failure of one or more rupture disks, wherein the identified rupture disk having the highest probability of failure is assumed to have failed.

3. A computer-implemented method as defined in claim 1, wherein step (c) further comprises continuing to simulate failures of one or more rupture disks until no further failures are predicted.

4. A computer-implemented method as defined in claim 1, wherein step (a) further comprises receiving data via a user-interface, the data defining the configuration of the wellbore.

5. A computer-implemented method as defined in claim 4, wherein the data defining the configuration of the wellbore comprises at least one of a number of the rupture disks, a burst rating of the rupture disks, a collapse rating of the rupture disks, or a depth of the rupture disks.

6. A computer-implemented method as defined in claim 1, further comprising determining an alternative configuration of the wellbore in an event that progressive failures were determined.

7. A system comprising processing circuitry to determine an occurrence of progressive failures of rupture disks along a wellbore, the processing circuitry performing the method comprising:
   (a) analyzing a configuration of the wellbore;
   (b) determining an annular pressure buildup of the wellbore based upon the configuration of the wellbore;
   (c) determining whether progressive failure of the rupture disks will occur along the wellbore; and
   (d) outputting a report reflecting the determination of step (c).

8. A system as defined in claim 7, wherein step (c) further comprises:
   simulating a failure of one or more rupture disks;
   identifying the rupture disk having a highest probability of failure; and
   re-simulating a failure of one or more rupture disks, wherein the identified rupture disk having the highest probability of failure is assumed to have failed.

9. A system as defined in claim 7, wherein step (c) further comprises continuing to simulate failures of one or more rupture disks until no further failures are predicted.

10. A system as defined in claim 7, wherein step (a) further comprises receiving data via a user-interface, the data defining the configuration of the wellbore.

11. A system as defined in claim 10, wherein the data defining the configuration of the wellbore comprises at least one of a number of the rupture disks, a burst rating of the rupture disks, a collapse rating of the rupture disks, or a depth of the rupture disks.

12. A system as defined in claim 7, further comprising determining an alternative configuration of the wellbore in an event that progressive failures were determined.

13. A non-transitory computer readable storage medium storing a computer program product comprising instructions which, when executed by at least one processor, causes the processor to perform a method comprising:
   (a) analyzing a configuration of a wellbore;

(b) determining an annular pressure buildup of the wellbore based upon the configuration of the wellbore;
(c) determining whether progressive failure of rupture disks will occur along the wellbore; and
(d) outputting a report reflecting the determination of step (c).

14. A computer program product as defined in claim 13, wherein step (c) further comprises:
    simulating a failure of one or more rupture disks;
    identifying the rupture disk having a highest probability of failure; and
    re-simulating a failure of one or more rupture disks, wherein the identified rupture disk having the highest probability of failure is assumed to have failed.

15. A computer program product as defined in claim 13, wherein step (c) further comprises continuing to simulate failures of one or more rupture disks until no further failures are predicted.

16. A computer program product as defined in claim 13, wherein step (a) further comprises receiving data via a user-interface, the data defining the configuration of the wellbore.

17. A computer program product as defined in claim 16, wherein the data defining the configuration of the wellbore comprises at least one of a number of the rupture disks, a burst rating of the rupture disks, a collapse rating of the rupture disks, or a depth of the rupture disks.

18. A computer program product as defined in claim 13, further comprising determining an alternative configuration of the wellbore in an event that progressive failures were determined.

19. A computer-implemented method to analyze progressive failures of rupture disks along a wellbore, the method comprising:
    determining, using a computer, a consequence of a failure of a first rupture disk along the wellbore; and
    determining, using the computer, whether a second rupture disk would fail in response to the failure of the first rupture disk.

20. A computer-implemented method as defined in claim 19, further comprising determining an alternative configuration of the wellbore in an event that failure of the second rupture disk was determined.

21. A computer-implemented method as defined in claim 19, further comprising receiving data defining a configuration of the wellbore via a user interface.

22. A computer-implemented method as defined in claim 21, wherein the data defining the configuration of the wellbore comprises at least one of a number of rupture disks, a burst rating of the rupture disks, a collapse rating of the rupture disks, or a depth of the rupture disks.

* * * * *